United States Patent
Snodgrass

(10) Patent No.: US 7,205,933 B1
(45) Date of Patent: Apr. 17, 2007

(54) HOSTILE PLATFORM POSITION LOCATION UTILIZING NETWORKED COMMUNICATIONS

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 46 days.

(21) Appl. No.: 10/938,679

(22) Filed: Sep. 10, 2004

(51) Int. Cl.
*G01S 13/06* (2006.01)

(52) U.S. Cl. ..................................... 342/148
(58) Field of Classification Search .................. 342/70
See application file for complete search history.

(56) References Cited

U.S. PATENT DOCUMENTS

| | | | | |
|---|---|---|---|---|
| 4,017,859 A | * | 4/1977 | Medwin | 342/383 |
| 6,026,304 A | * | 2/2000 | Hilsenrath et al. | 455/456.2 |
| 6,288,675 B1 | * | 9/2001 | Maloney | 342/457 |
| 6,580,392 B2 | | 6/2003 | Yu | |
| 6,693,592 B2 | * | 2/2004 | Dowdle et al. | 342/453 |
| 6,853,847 B2 | * | 2/2005 | Shioda et al. | 455/456.1 |
| 6,871,077 B2 | * | 3/2005 | Kennedy, Jr. | 455/456.5 |
| 6,963,303 B1 | * | 11/2005 | Beisner | 342/159 |
| 6,980,814 B2 | * | 12/2005 | Nohara et al. | 455/456.1 |
| 7,019,692 B2 | * | 3/2006 | Baugh et al. | 342/378 |

* cited by examiner

*Primary Examiner*—Thomas H. Tarcza
*Assistant Examiner*—Matthew Barker
(74) *Attorney, Agent, or Firm*—Nathan O. Jensen; Kyle Eppele

(57) ABSTRACT

The communication system utilizes transmitters that provide communication transmissions having deterministic data. Receivers of the system have the digital processing capability for correlating received transmission reflections of the deterministic data amongst the receivers, the reflections of the deterministic data being from objects within the transmission range of a respective transmitter. The correlating includes utilizing relatively weak multipath signals of the transmission reflections and the superimposition of external data therewith to provide a resulting data base of range reflections. The range reflections are provided to others of said plurality of receivers for processing to derive the environment and the locations and movements of objects without the use of a specific interrogation signal, thereby providing situational awareness.

17 Claims, 3 Drawing Sheets

HOSTILE PLATFORM POSITION LOCATION UTILIZING NETWORKED COMMUNICATIONS

BACKGROUND OF THE INVENTION

1. Field of the Invention

The present invention relates to systems and methods for determining the locations of objects and more particularly to deriving the environment and the locations and movements of objects without the use of a specific interrogation signal, thereby providing situational awareness.

2. Description of the Related Art

There is an attempt to increase the lethality of vehicles of Future Combat Systems, "Objective Force" by the use of speed and agility. This requires thin skinned armor which increases the vulnerability to conventional weapons of all types. To counter this weakness, in present systems the use of Unmanned Ground Sensors (UGS) must be deployed ahead of the Objective Force vehicles to provide them situational awareness of potential enemies. If the UGS cannot be deployed then the Objective Force cannot risk being utilized.

As will be disclosed below the present invention provides for minimizing the dependency on UGS for deployment of the Objective Force and other thin skinned armor forces. U.S. Pat. No. 6,580,392, entitled "Digital Beamforming for Passive Detection of Target Using Reflected Jamming Echoes" discloses a radar system and method for detecting and tracking a target of interest in the presence of interference, wherein the interference emits interfering signals, includes a receiver for receiving the interfering signals directly from the interference. The receiver also receives reflected signals, wherein the reflected signals are the interfering signals reflected by the target of interest. The interfering signals and the reflected signals are compared to detect the target of interest. In one embodiment, the reflected signals and the interfering are cross-correlated. The results of the cross-correlation are used to obtain range, position, and velocity information about the target of interest from a range/Doppler map. The '392 system relies on the enemy to emit hostile Damming) signals.

Conventional art solves this where the friendly object actively transmits a radar signal and receives its reflection. The disadvantage is that a directional antenna is needed in conjunction with microwave frequencies which are easier to hide from via stealthy technologies. As will be disclosed below, the lower VHF and UHF communications frequencies, which are likely utilized with the present invention, are practically impossible to hide from using stealth technologies.

SUMMARY OF THE INVENTION

In a broad aspect, the present invention is a communication system that utilizes transmitters that provide communication transmissions containing some deterministic data. Receivers of the system have the digital processing capability for correlating received transmission reflections of the deterministic data amongst the receivers, the reflections of the deterministic data being from objects within the transmission range of a respective transmitter. The correlating includes utilizing relatively weak multipath signals of the transmission reflections and the superimposition of external data therewith to provide a resulting data base of range reflections. The range reflections are provided to others of said plurality of receivers for processing to derive the environment and the locations and movements of objects without the use of a specific interrogation signal, thereby providing situational awareness.

Use of the present invention has several advantages over the prior art discussed above. Unlike, for example, the '392 patent discussed above, the present approach does not require the enemy to emit anything. It "semi-passively" detects objects, i.e. the receivers of the present invention neither illuminate nor stimulate the target. (Generally, no signals are required to originate from any source other than the transmissions normally utilized for networked communications.)

A primary advantage of the present invention is derived from the need to conduct communications using dynamic networking protocols. This communication is essential to provide accurate and timely Situational Awareness Communications (SAC). Because the radios must communicate anyway, by utilizing their transmissions not only to provide SAC, but by realizing that the battlefield is being illuminated, the reflections of the SAC can be analyzed by all the friendly battlefield participants to derive the positions of other non-network participants (presumably hostile, because they are not in the network).

The advantage of legacy and current art using microwave radar is that much greater precision is possible. The disadvantage is obvious. Most fighting vehicles, (e.g. Bradley, Abrams, Paladin, HMMWV, etc) are not equipped with search radar and will likely never be. However, they are and will continue to be, equipped for SA communications. The present invention provides the ability to use the required communications to derive radar like data, provides increased survivability, is relatively low cost and is relatively small size—all benefits to the warfighter.

The present invention may be used for both ground-based applications and airborne platforms. It can be utilized with forward dismounted network participants such as Land Warrior. Also, the innovation is not frequency specific although certain frequencies will have obvious reflection resolution advantages over others. The principles herein have numerous applications outside of the battlefield. For example, it can be utilized for airborne drug traffic interdiction. Because legitimate flights have a flight plan, the discovery of flights without registered flight plans would warrant direct investigation. This innovation would differ from conventional art that use direct radar illumination (that potentially alerts the suspect) because it is able to exploit the reflections of whatever signals are already available in the spectrum in the region of operation. An example might be using multiple receivers at separate locations receiving the reflections from commercial high powered FM transmissions in Miami, Fla. bouncing off aircraft approaching landfall. This data would be processed to derive an air traffic picture, compared against the ATC expected traffic, and interdiction action taken for the exceptions.

Although the present invention is computationally intensive it is quite viable with the fielding of the Wideband Networking Waveform and high throughput processing of JTRS radios.

BRIEF DESCRIPTION OF THE DRAWINGS

FIG. 1A shows a portion of a battlefield prior to the introduction of an unknown tank. FIG. 1B shows the introduction of an unknown tank into the battlefield and a determination of its path and position.

FIG. 2A shows the received signals at Tank B. FIG. 2B shows the received signals at Tank C.

DETAILED DESCRIPTION OF THE INVENTION

Figure 1A:
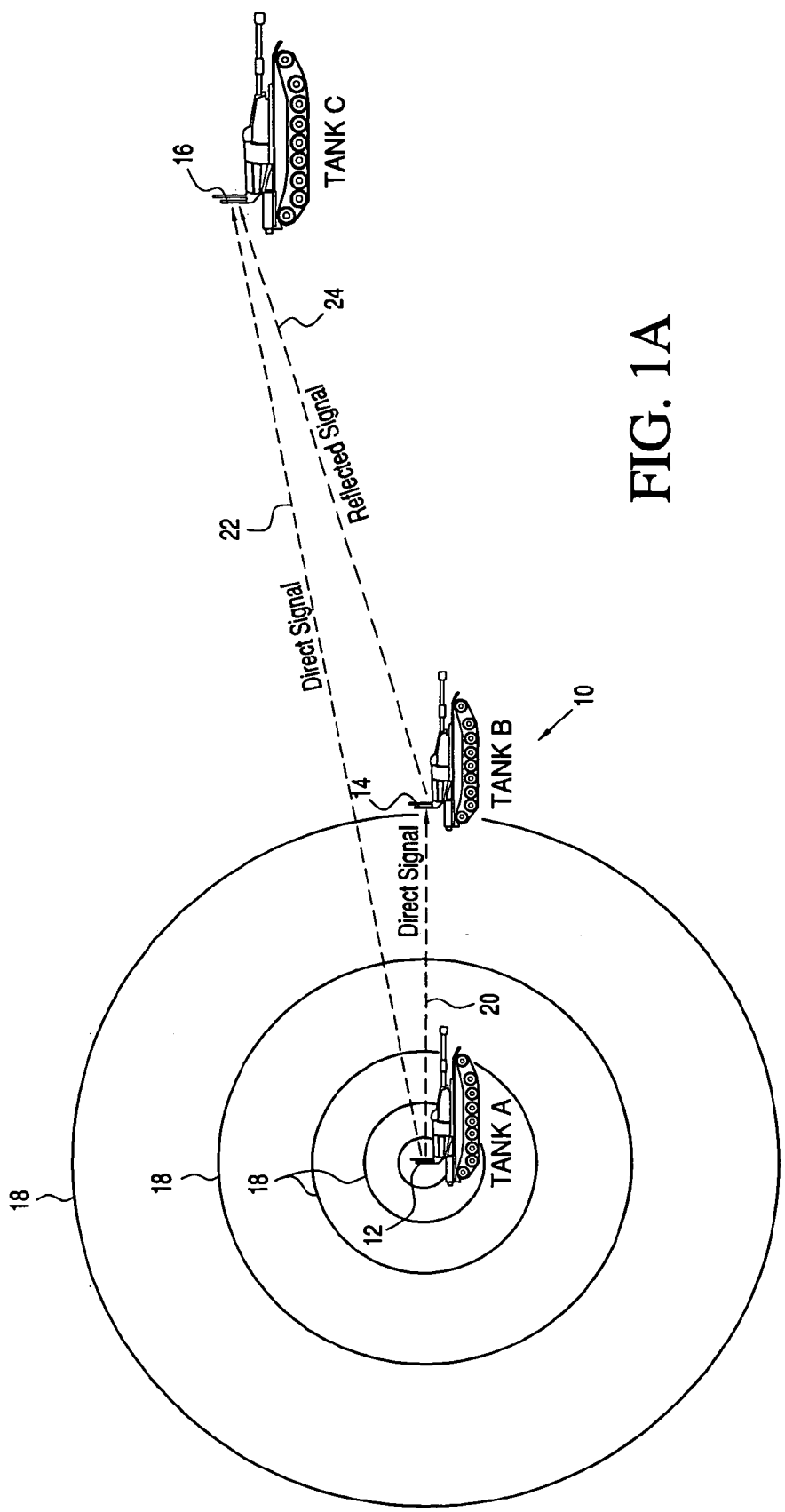
FIGS. 1A and 1B are diagrammatic representations of a digital battlefield showing geographical relationships between objects in the battlefield and utilization of the communication system of the present invention.

Referring now to the drawings and the characters of reference marked thereon, FIG. 1 illustrates a digital battlefield 10 utilizing the communication system of the present invention. The communication system includes a plurality of transmitter/receiver units 12, 14, 16 which are positioned on known objects, i.e. Tanks A, B and C, respectively. Each transmitter/receiver 12, 14, 16 has a transmission range in three dimensions as illustrated by concentric circles 18. Deterministic data is transmitted. Deterministic data has distinctive characteristics that make it easily detectable and is distinctive from the vast bulk of data being received. This data is typically a digital "phrase" or sequence that is sufficiently long so as to be statistically significantly "unique" for the confidence required (e.g. 1 occurrence in ten million).

For the purposes of illustration assume that Tank A originates a single transmission. Tank B receives it first, as shown by direct signal 20. Tank C receives this transmission as a direct signal 22 after Tank B receives it. Later, Tank C also receives another, much weaker version of the transmission that was reflected from Tank B as denoted by numeral designation 24. This reflected, weaker signal 24 is referred to as a multi-path signal.

Figure 1B:
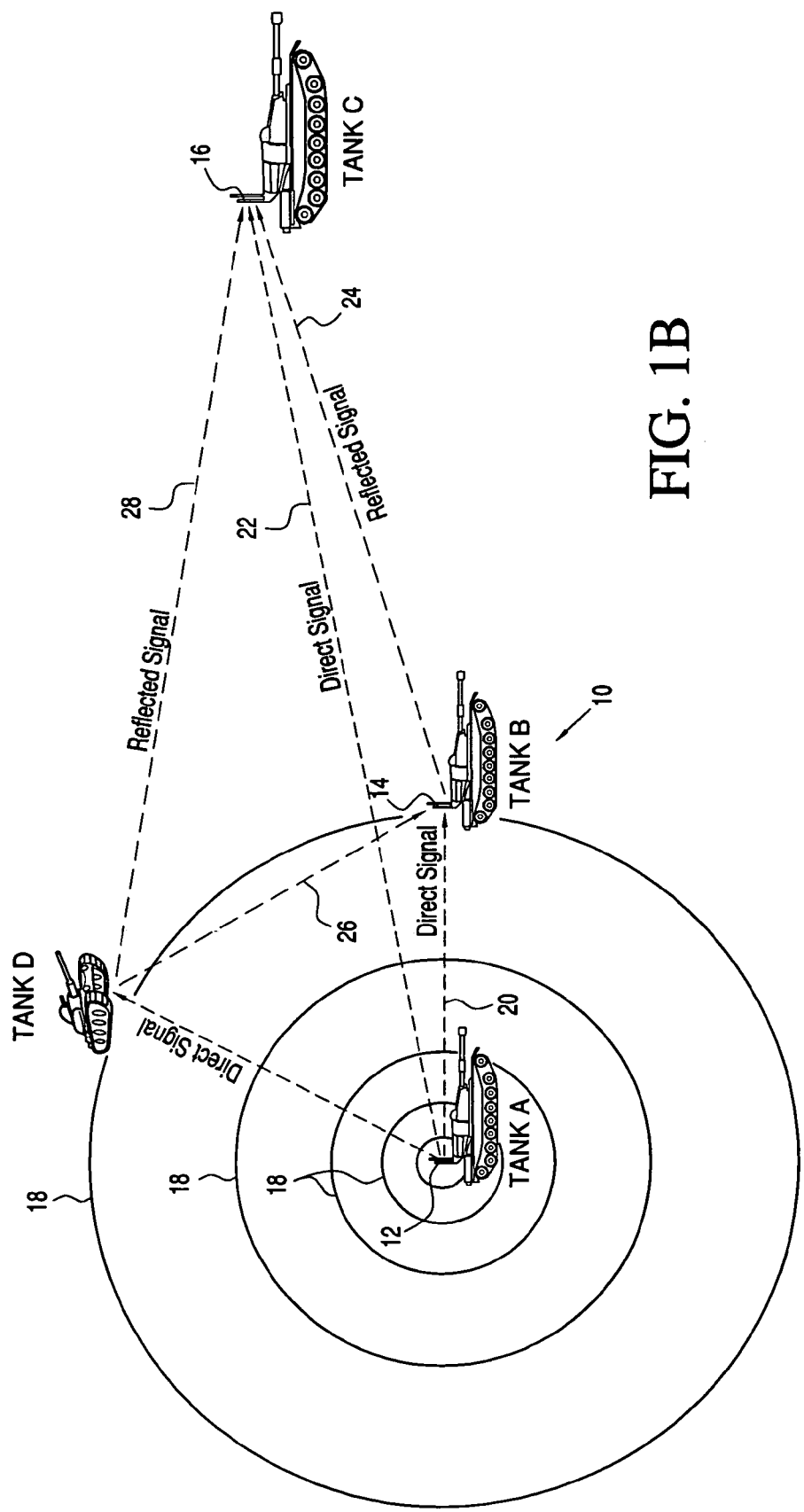

Referring now to FIG. 1B, if an unknown object, i.e. Tank D, is introduced into the battlefield 10 within the radio range of Tank A's transmission then Tanks B and C would also receive reflected signals 26, 28 from Tank D. Each transmitter/receiver unit 12, 14, 16 has a correlator for providing the digital processing capability for correlating received transmission reflections of the deterministic data amongst the transmitter/receiver units. Thus, in the example described, this correlating includes utilizing the relatively weak multi-path signals 26, 28 of the transmission reflections from Tank D. The correlating includes the superimposition of external data with transmission reflections to provide a resulting data base of range reflections. The range reflections are provided to the other transmitter/receiver units for processing. Thus, the location and movements of Tank D can be discerned without the use of a specific interrogation signal.

The external data may include, for example, satellite pictures, topographical data, radar tracks, surveillance reports, ELINT (electronic intelligence gathering), direct target tracks from other nodes and intelligence reports from Forward Observers or UAVs.

Figure 2B:
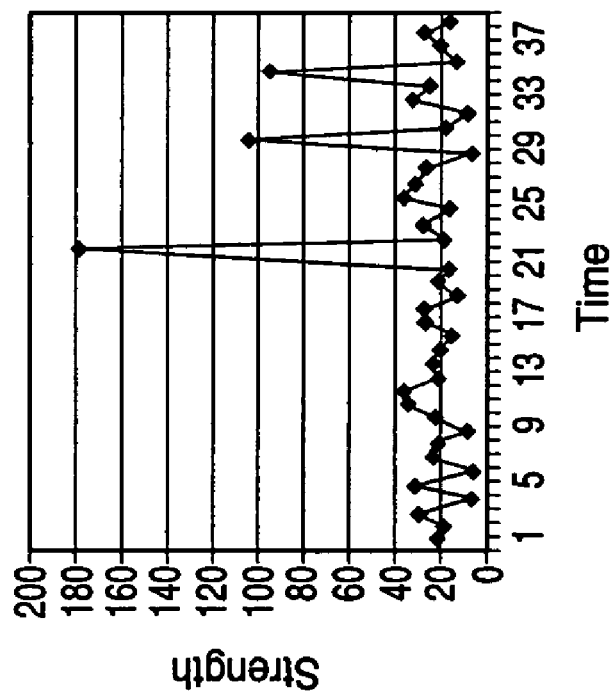
FIGS. 2A and 2B are graphs of the received signals reflections that are processed to extract positional data.
Figure 2A:
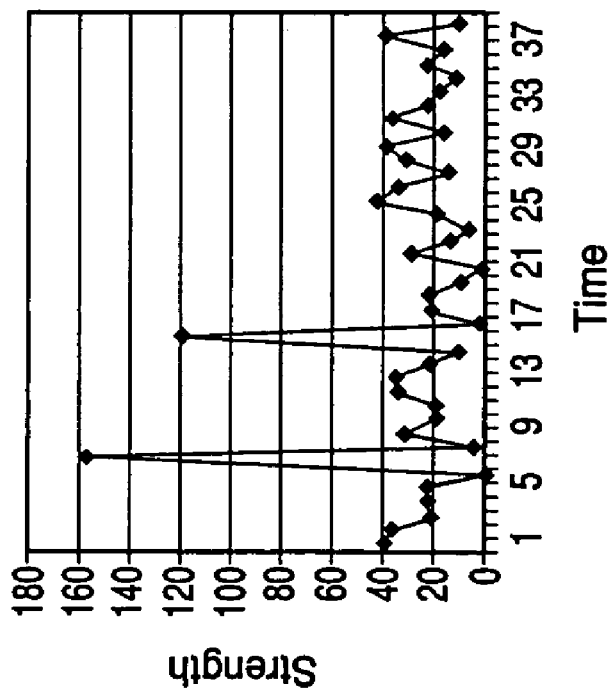

Referring now to FIGS. 2A and 2B graphs of the strength of the received signals as a function of time, at Tanks B and C, respectively, are illustrated. The vertical axis may be, for example, correlation magnitude (bits that match the expected deterministic data). The horizontal axis may be, for example, the modulation symbol rate (time in units of the modulation symbol rate being used). As can be seen from FIG. 2A, Tank B clearly detects a second vehicle (i.e. Tank D) and can determine its slant range distance from the reflection peaks. Because slant range distance does not provide a unique point location solution, but a curving circle of possible locations the data collected by any one node is of little value to that node. However, as can be seen in FIG. 2B, Tank C clearly detects signal peaks from two vehicles from the reflections it receives (i.e. reflected signals 24 and 28). Tank C can determine the slant range distance to both. Now, when tanks B and C interchange the multipath time-of-arrival (TOA) information between themselves, then both tanks B & C are able to triangulate to determine the unique location of the unknown vehicle.

Although the invention has been discussed with respect to transmitter/receiver units 12, 14, 16 it is understood that separate transmitters and receivers can be utilized. This is evidenced by the previous illustration where the source of the signal was unrelated to the determination or processing of the multipath signals.

There are a variety of acceptable correlation techniques that may be used. These include, for example, target track correlation, statistical correlation, HDOP (horizontal dilution of precision), and SDOP (spherical dilution of precision). Furthermore, the correlator may be a digital correlator, an optical correlator or a Surface Acoustic Wave correlator.

In the modern ground mobile Digital Battlefield most communications will be carried by the Wideband Networking Waveform (WNW). The present invention uses its Signal In Space (SIS) attributes although many other time division waveforms with distinctive synchronization preambles can be exploited to achieve the same results.

Today, only specialized warfighting vehicles carry radar or sensors that are suitable to detect enemy vehicles (airborne or ground). This limits what the forward vehicles are able to "see". The Joint Surveillance Target Attack Radar System (Joint Stars), for example, can miss an enemy vehicle in the shadow of an obstruction because it is one or two hundred miles distant.

The nature of the Digital Battlefield, however has each participant originating transmissions with deterministic preamble headers at a fairly high rate. In any one particular region it is reasonable to expect that a friendly vehicle would receive dozens of RF messages each second from the (huge) network of friendly participants supplying C3I, SA, etc. For WNW, each of these messages is sent in a deterministic time slot from a participant that knows his precise location and transmits in a TDMA time slot his message with a deterministic preamble header. This invention exploits the fact that these deterministic communications signals also impinge on the hostile forces vehicles as well as the friendly vehicles.

In application, significant digital processing capability is added to each (JTRS) receiver such that it can correlate the expected received messages preamble against the background noise. Obviously, it will "find" a very large correlation when the line of sight signal arrives but it will also be able to detect multiple additional correlations that occur after that, that are substantially weaker, as discussed above. (In an urban setting it is possible to never receive the "direct" radio communications because there is no direct visibility. In this case, all data recovery is done via reflections).

Exploitation of these weaker reflections is a central aspect of this invention. Inasmuch as the receiving node knows its own location precisely and the time of transmission of the source it received the message from, as well as the originator's precise location, it is able to calculate circles upon which the sources of reflections must have originated. Some of these reflections will have been caused by mountains and other natural obstructions and can be filtered out by use of a topographical map.

The resulting data base of range reflections are sent to other participants who have also gathered reflection data from the same transmission. By processing the dozens or even scores of transmission reports for each transmission a picture of what is reflecting RF and where it is located can be determined. This confidence may be increased by feeding the results into a Kalman filter with subsequent transmissions which utilize different transmission frequencies. This data filtering function allows a more accurate and confident situational picture to be constructed.

Since the friendly objects know where they are located, the remaining reflections may be either hostile or physical objects. An indication of movement of a reflection point can be used to eliminate it as being a physical object. By identifying a potential hostile object, specific action can be taken (positive ID, evasion, sending in an Unmanned Ground Sensor, determining it is a rock outcropping, etc.). Thus, importantly, action can be taken, whereas without this capability friendly sources are moving into the unknown.

The present invention exploits, via computational intensity, the Signals In Space (SIS) that are used to carry basic communications in the tactical battlefield. Since it is an RF network that creates the Digital Battlespace, use of these transmissions to derive hostile units and enhance the warfighters' Situational Awareness is one step further in making the Objective Force fast, responsive and unable to be taken by surprise.

As mentioned above, although the present invention has been described relative to a ground based application, the innovation has application to airborne platforms as well as forward dismounted network participants such as Land Warrior. Also, the innovation is not frequency specific although certain frequencies will have obvious reflection resolution advantages over others.

As mentioned, although computationally intensive, the principles of this invention are viable with the fielding of the Wideband Networking Waveform and high throughput processing in the JTRS radios.

Depending on the terrain where the networked communications are taking place, this innovation can be implemented in many different spectral bands. For example, if the warfighter is located in dense jungle foliage, then lower frequencies would be preferable such as VHF which are not greatly affected. In contrast, if the battle field were in a dry desert, microwave frequencies would be preferred because of their higher capacities and greater reflection resolution, these being enabled because there is little foliage in a desert to absorb RF signals.

A potential receiver for use with the present invention is to modify a "RAKE" receiver so as to have many virtual digital receivers correlating and processing the same analog receiver output frequency for the presence of weak reflections. After the reflections are identified, this information would be passed up the processing chain for the higher level function of interchanging with other nodes and the correlation and triangulation with existing data and other known vehicle locations.

The transmitter utilized by this invention generally transmits in three dimensions for flying. However, other types of transmitters may be used in other applications. For example, two-dimensional transmission would be all that is required on a desert or sea surface, and one direction, for example, with a train track.

Other embodiments and configurations may be devised without departing from the spirit of the invention and the scope of the appended claims.

The invention claimed is:

1. A communication system, comprising:
   a plurality of receivers and transmitters, each said transmitter for providing communication transmissions having deterministic data, each said receiver having the digital processing capability for correlating received transmission reflections of said deterministic data amongst said plurality of receivers, said transmission reflections of said deterministic data being from objects within said transmission range of a respective transmitter, said correlating including utilizing relatively weak multipath signals of said transmission reflections and the superimposition of external data therewith to provide a resulting data base of range reflections, said range reflections being provided to others of said plurality of receivers for processing to derive the environment and the locations and movements of objects without the use of a specific interrogation signal, thereby providing situational awareness.

2. The communication system of claim 1, wherein said plurality of receivers and transmitters comprise transmitter/receiver units.

3. The communication system of claim 1 wherein said deterministic data comprises deterministic preamble headers.

4. The communication system of claim 1 wherein said external data comprises satellite pictures.

5. The communication system of claim 1 wherein said external data comprises topographical data.

6. The communication system of claim 1 wherein said external data comprises radar tracks.

7. The communication system of claim 1 wherein said external data comprises surveillance reports.

8. The communication system of claim 1 wherein said external data comprises ELINT (electronic intelligence gathering).

9. The communication system of claim 1 wherein each of said receiver, comprises:
   a track correlator; and,
   a database operably associated with said track correlator for retaining information regarding external data topography, geographical location, and time of day.

10. The communication system of claim 9 wherein said track correlator comprises a Kalman filter.

11. The communication system of claim 9 wherein said track correlator utilizes statistical correlation.

12. The communication system of claim 9 wherein said track correlator utilizes HDOP (horizontal dilution of precision).

13. The communication system of claim 9 wherein said track correlator utilizes SDOP (spherical dilution of precision).

14. A communication system for semi-passively detecting objects in a digital battlefield, comprising:
   a plurality of receivers and transmitters associated with known objects in a digital battlefield, each transmitter for providing communication transmissions having deterministic data, each said receiver having the digital processing capability for correlating received transmission reflections of said deterministic data amongst said plurality of receivers, said transmission reflections of said deterministic data being from unknown objects within said transmission range of a respective transmitter, said correlating including utilizing relatively weak multipath signals of said transmission reflections and the superimposition of external data therewith to provide a resulting data base of range reflections, said range reflections being provided to others of said plurality of receivers for processing to derive the environment and the locations and movements of unknown objects without the use of a specific interrogation signal, thereby providing situational awareness.

15. The communication system of claim 14, wherein said plurality of receivers and transmitters comprise transmitter/receiver units.

16. The communication system of claim 14 wherein said deterministic data comprises deterministic preamble headers.

17. A method for providing situational awareness of objects in an environment, comprising the steps of:

utilizing a plurality of transmitters, each said transmitter for providing communication transmissions having deterministic data;

utilizing a plurality of receivers, each said receiver having the digital processing capability for correlating received transmission reflections of said deterministic data amongst said plurality of receivers, said deterministic data being from objects within said transmission range of a respective transmitter, said correlating including utilizing relatively weak multipath signals of said transmission reflections and the superimposition of external data therewith to provide a resulting data base of range reflections, said range reflections being provided to others of said plurality of receivers for processing to derive the environment and the locations and movements of objects without the use of a specific interrogation signal, thereby providing situational awareness.

* * * * *